July 23, 1957     A. BOSCHI     2,800,357
RESILIENT WHEELS

Filed March 22, 1954     2 Sheets-Sheet 1

INVENTOR
ANTONIO BOSCHI

BY *Stone, Boyden & Mack*
ATTORNEYS

July 23, 1957     A. BOSCHI     2,800,357
RESILIENT WHEELS

Filed March 22, 1954     2 Sheets-Sheet 2

INVENTOR
ANTONIO BOSCHI

BY *Stone, Boyden & Mack*
ATTORNEYS

United States Patent Office 2,800,357
Patented July 23, 1957

2,800,357

RESILIENT WHEELS

Antonio Boschi, Milan, Italy, assignor to Societa Applicazioni Gomma Antivibranti, S. A. G. A. Societa per Azioni, Milan, Italy Application March 22, 1954, Serial No. 417,809

Claims priority, application Italy April 20, 1953

1 Claim. (Cl. 295—11)

This invention relates to resilient wheels for track vehicles, and more particularly has reference to wheels of the type having annular rubber strips, inserted between the outer portion of a flange integral with the hub of the wheel and the inner portions of opposed side flanges attached to the demountable rim of the wheel, and so arranged that said strips transmit the load on the wheel to its rim by shear-flexure strain.

One of the side flanges may be made integral with the rim and the other side flange demountably attached to said rim, or both side flanges may be demountably attached to said rim. In the first construction, both rubber strips are attached, as by vulcanization to the hub flange and one of said strips is also similarly attached to the demountable side flange of the rim. In the second construction, both rubber strips are attached, as by vulcanization, to the hub flange only. By thus attaching the rubber strips directly to the flanges, the additional complication and expense of intermediate metallic rings is eliminated.

Where only one of the side flanges is demountably attached to the rim, the contacting surface therebetween is conical, so as to provide an adjustable positioning of the flange with respect to the rim, and the rubber strips, whereby the amount of lateral precompression of the rubber strips may be selectively determined when the parts are assembled in the wheel. On the other hand, where both side flanges are demountably attached to the rim, the contacting surfaces therebetween are cylindriral, and the amount of lateral precompression of the rubber strips is determined by the width of a spacer flange integral with the rim.

In both constructions, the component parts of the wheel are secured in assembled position, either by means of a series of circumferentially disposed bolts, or by means of a deformable steel connecting ring, whereby the desired precompression of the rubber rings is obtained.

With the foregoing and other objects in view which may be incident to my improvements, my invention consists in the combination and arrangement of elements described below and illustrated in the accompanying drawings, wherein.

In all the figures of the drawing the same reference numerals are used to indicate like elements.

Figure 1:
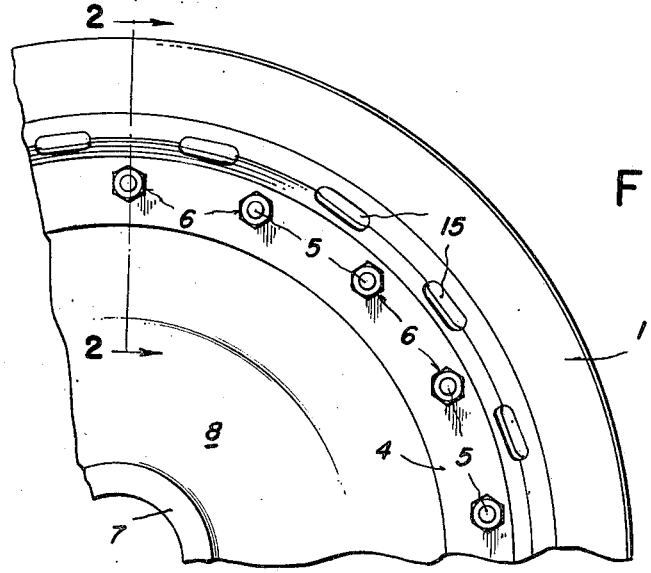
Figure 1 is a partial side elevation of a wheel constructed in accordance with one embodiment of my invention.
Figure 2:
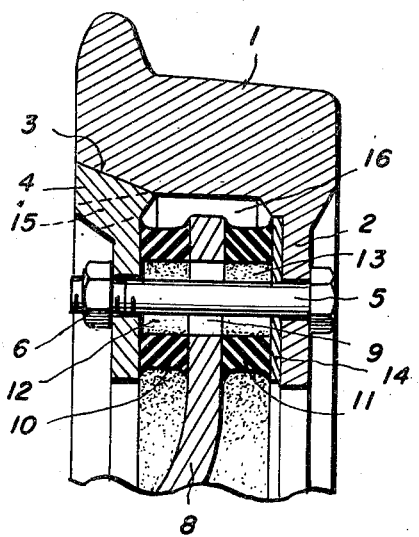
Figure 2 is a cross-sectional view along the line 2—2 of the wheel shown in Figure 1.

Referring first to Figures 1 and 2, the reference numeral 1 denotes the track engaging rim of a wheel having an inwardly depending integral flange 2 and an oppositely disposed conical shoulder 3 for the reception of a conically bevelled, detachable, annular side flange 4 which is secured in assembled position on rim 1 by a series of circumferentially spaced bolts 5 and nuts 6. The hub 7 of the wheel has an outwardly extending, integral, circular flange 8 which is provided near its outer edge with a series of holes 9 through which bolts 5 pass, as shown in Figure 2.

A pair of annular rubber strips 10 and 11 are interposed between central flange 8 and side flanges 2 and 4, and are each provided with holes 12 and 13 which register with holes 9 in flange 8, all of said holes being substantially larger than bolts 5 which pass therethrough so as to afford space for the radial and tangential movement of flange 8, with reference to side flanges 2 and 4, when strips 10 and 11 are strained in shear-flexure by the transmission of load from the former to the latter. Strips 10 and 11 are attached directly to central flange 8, as by vulcanization, and strip 10 is also similarly attached to side flange 4, thereby eliminating the additional complication and expense of metallic inserts between said strips and flanges. A metallic ring 14 is, however, inserted between rubber strip 11 and side flange 2, to facilitate the assembly to the component parts of the wheel. Side flange 4 is provided with a series of circumferentially spaced slots 15 extending laterally and through which the cooling air enters an annular space 16 in rim 1 and circulates therethrough during revolution of the wheel.

By virtue of the conical relation of shoulder 3 and side flange 4, strips 10 and 11 may be precompressed laterally by suitably tightening nuts 6 on bolts 5.

Figure 3:
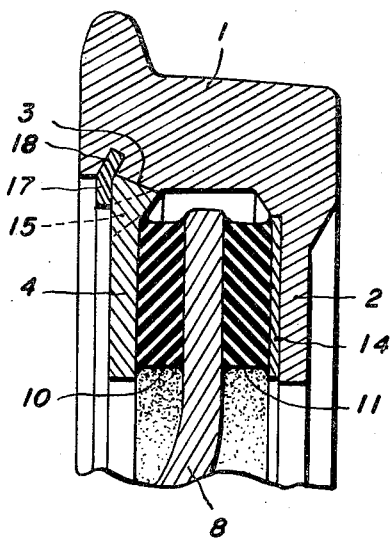
Figure 3 is a view similar to Figure 2 of a modified form of the wheel shown in Figure 1.

Figure 3 shows a modification of the construction disclosed in Figures 1 and 2, in which side flange 4 is secured to rim 1 by means of a deformable steel ring 17 which seats in an inclined slot 18 in the rim, instead of bolts 5 and nuts 6. In Figure 3, the selected lateral precompression of strips 10 and 11 is obtained by virtue of the slope of slot 18.

Figure 4:
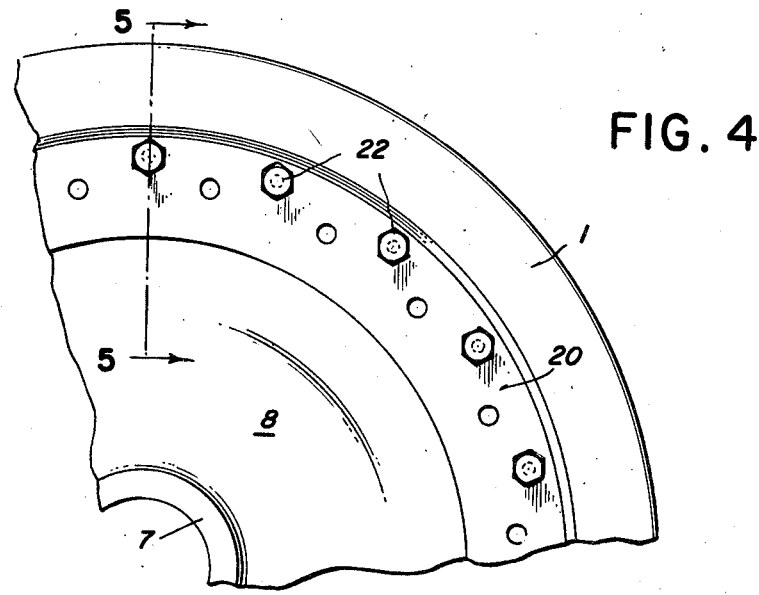
Figure 4 is a view similar to Figure 1 of another embodiment of my invention.
Figure 5:
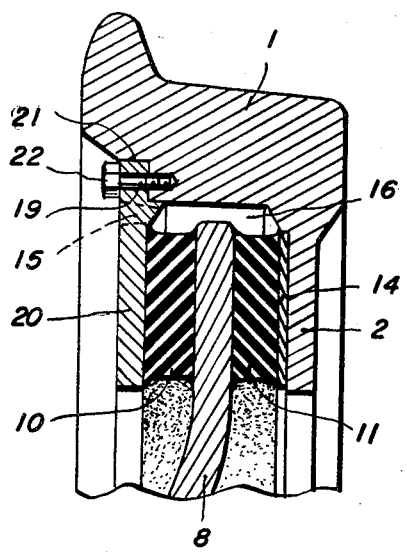
Figure 5 is a cross-sectional view along the line 5—5 of the wheel shown in Figure 4.

Figures 4 and 5 show an alternate construction of Figure 2, wherein a square-faced extension 19 on side flange 20, seated in a similar slot 21 in rim 1, is substituted for ring 17 and slot 18 of Figure 3, and extension 19 is attached to rim 1 by a series of circumferentially spaced tap bolts 22; whereby strips 10 and 11 are laterally precompressed without recourse to any conical surfaces, as in Figures 1 and 2.

Figure 6:
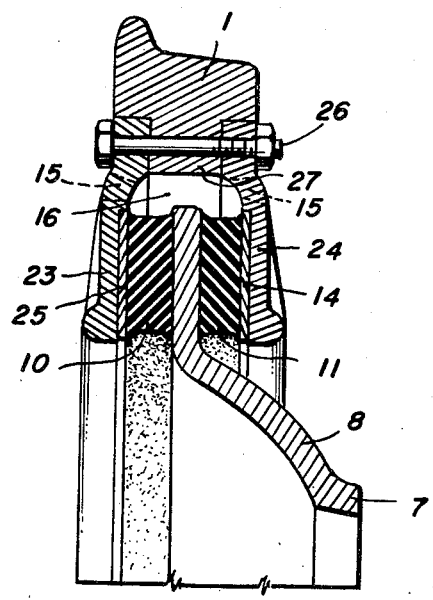
Figure 6 is a view similar to Figure 5 of a modified form of the wheel shown in Figure 4.

Figure 6 shows another embodiment of my invention, wherein a pair of similarly shaped, demountable side flanges 23 and 24 are used in lieu of side flanges 2 and 20 of Figure 5 and a metallic ring 25 is interposed between strip 10 and side flange 23. Also, in Figure 6, side flanges 23 and 24 are secured to rim 1 by bolts 26, which pass through an inwardly extending web 27 of said rim, whereby the extent of lateral precompression of strips 10 and 11 is determined by the width of web 27, when the component parts of the wheel are in assembled position as shown in Figure 6.

While I have shown and described the preferred embodiments of my invention, I do not limit myself to the precise details of construction and arrangement of elements disclosed by way of illustration, as these may be changed and modified by those skilled in the art without departing from the spirit of my invention nor exceeding the scope of the appended claim.

I claim:

A resilient vehicle wheel comprising a rigid metal rim having a pair of inwardly extending side flanges, at least one of said flanges being detachable from the rim, a metal hub having a radially outwardly extending central flange interposed between said pair of side flanges, a pair of annular rubber strips between opposite faces of said central flange and the inner faces of the adjacent side flanges, said rubber strips being fixed to the respective faces of the central flange and the side flanges and being of such size with respect to the spacing between the central flange and the side flanges that the strips are under compression, said rubber strips, central and side flanges and the inner surface of said rim defining an annular chamber, and one of said side flanges having walls defining circumferentially-spaced laterally extending passages therethrough communicating between the annular chamber and the outer face of said one flange to allow circulation of cooling air in said annular chamber when the wheel is rotating to cool the inner surface of the rim, and means for securing the detachable side flange to the rim.

References Cited in the file of this patent

UNITED STATES PATENTS

| | | |
|---|---|---|
| 1,208,940 | Frommann | Dec. 19, 1916 |
| 2,295,269 | Piron | Sept. 8, 1942 |
| 2,295,270 | Piron | Sept. 8, 1942 |
| 2,328,614 | Busse | Sept. 7, 1943 |
| 2,533,176 | Oelkers | Dec. 5, 1950 |
| 2,643,153 | Boschi | June 23, 1953 |